Sept. 18, 1934. C. A. PURDY Re. 19,320

MATERIAL WINDING MACHINE.

Original Filed April 16, 1929 3 Sheets-Sheet 1

Inventor
Chester A. Purdy
By H. A. Carter Att'y.

Sept. 18, 1934. C. A. PURDY Re. 19,320

MATERIAL WINDING MACHINE

Original Filed April 16, 1929 3 Sheets-Sheet 2

Inventor
Chester A. Purdy
By H. A. Patterson Att'y.

Sept. 18, 1934. C. A. PURDY Re. 19,320
MATERIAL WINDING MACHINE
Original Filed April 16, 1929 3 Sheets-Sheet 3
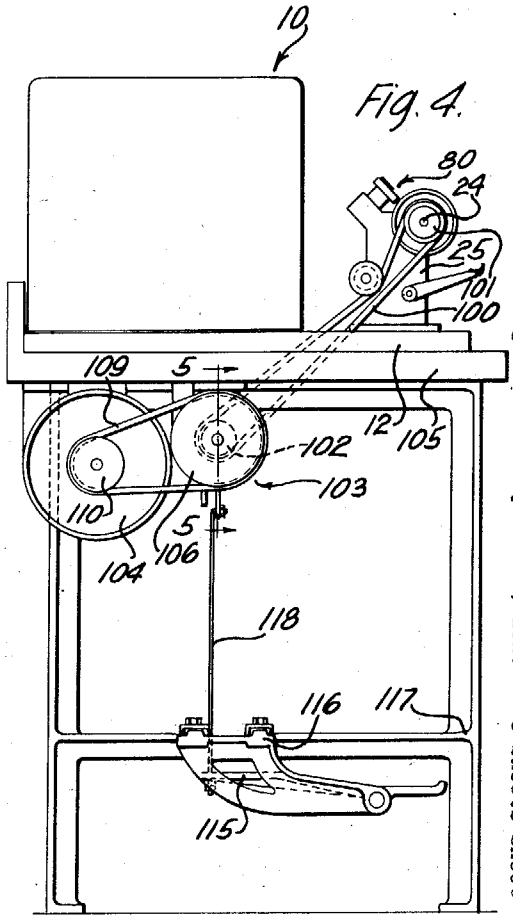
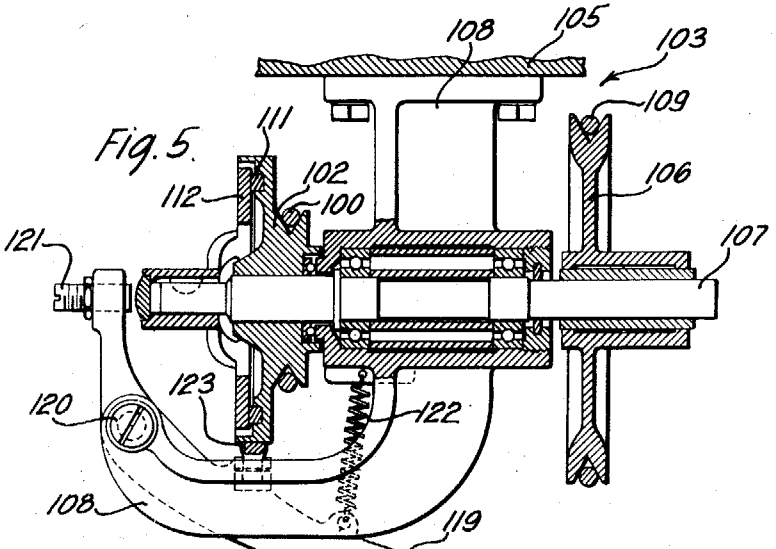
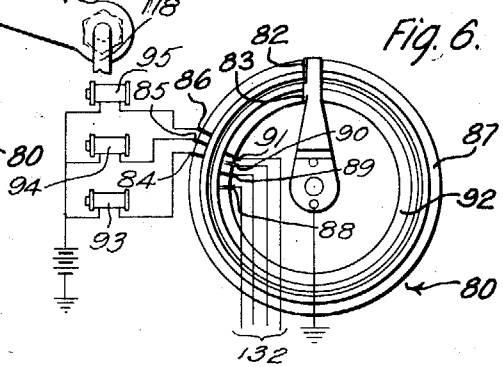
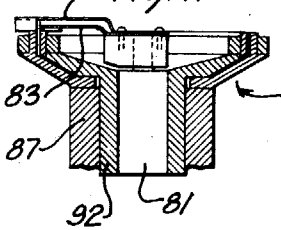
Inventor
Chester A. Purdy
By H. A. Pattison Att'y.

Reissued Sept. 18, 1934

Re. 19,320

UNITED STATES PATENT OFFICE 19,320

MATERIAL WINDING MACHINE

Chester A. Purdy, Oak Park, Ill., assignor to Western Electric Company, Incorporated, New York, N. Y., a corporation of New York Original No. 1,952,606, dated March 27, 1934, Serial No. 355,446, April 16, 1929. Application for reissue May 8, 1934, Serial No. 724,606

20 Claims. (Cl. 164—43)

This invention relates to material winding machines, and more particularly to a machine for forming electrostatic condensers.

The primary object of this invention is to provide an efficient and compact winding machine for accurately and rapidly forming material into coils.

One embodiment of the invention contemplates the provision of a condenser winding machine comprising a vertically disposed central supporting framework having mounted on opposite sides thereof a plurality of spindles for carrying spools of paper and metal foil, and a rotatable arbor on which the sheets of paper and foil are wound in alternate layers to form condensers. The rolls are provided with weighted members for maintaining the proper tension on the paper and foil. Operatively associated with the arbor are a pair of rotatable contact arms for engaging adjustably positioned contacts to effect the energization of a plurality of electromagnets and thus control the operation of individual knives for severing the paper and foil in predetermined sequence upon the completion of a predetermined number of revolutions of the arbors upon which the condensers are being wound. Resetting the knives against the tension of actuating springs connected thereto after the knives have been operated by the contact arms completing electrical circuits to energize the electromagnets is effected by a manually operated lever.

Other objects and advantages of the invention will more fully appear from the following detailed description taken in connection with the accompanying drawings, in which Fig. 1 is a side elevational view of a winding machine embodying the invention and particularly designed for the winding of electrical condensers;

Fig. 4 is a side elevational view showing a support for the winding mechanism and a driving means therefor;

Fig. 5 is an enlarged fragmentary sectional view taken on line 5—5 of Fig. 4 showing a manually operated clutch for connecting the winding mechanism to the driving means;

Fig. 6 is an enlarged plan view of an adjustable counting mechanism and circuit diagram for controlling the operation of the knives for severing the paper and foil;

Fig. 7 is a vertical, central sectional view thereof, and

Fig. 8 is a detailed view illustrating the mechanism for restoring one of the knives to its unactuated position.

Figure 1:
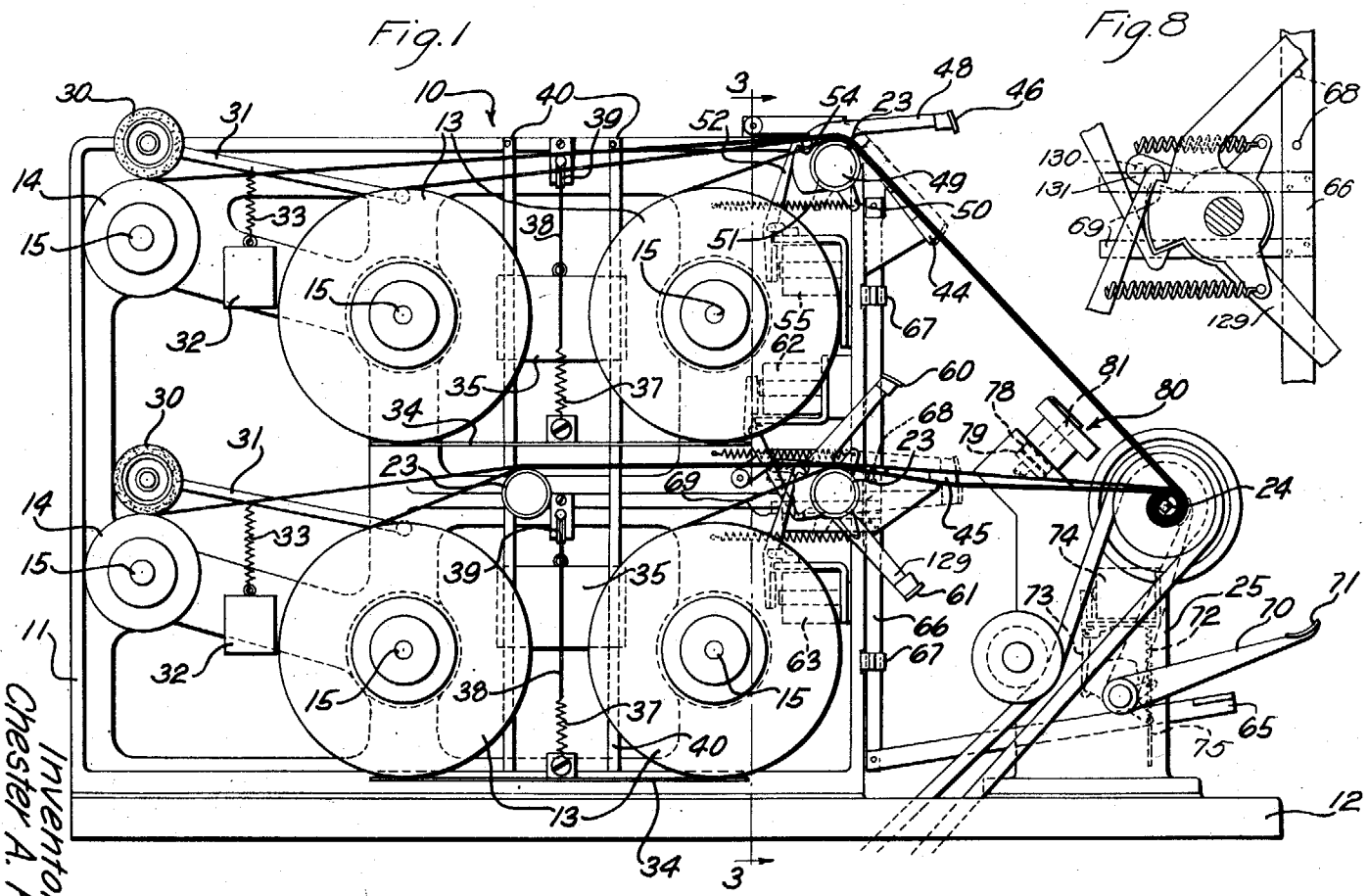

Referring now to the drawings wherein like reference numerals designate similar parts throughout the various views, the numeral 10 designates a winding mechanism including a central, vertical frame 11 secured to a bed plate 12 and having supported on both sides thereof a plurality of supply rolls of rice paper and tin foil 13 and 14, respectively, rotatably mounted on spindles 15—15 journaled in the sides of the frame 11. Each of the spindles is provided with a tapered, cylindrical, flanged portion 20 for engaging the inner end of the supply roll of paper or foil and a collar 21 having a similarly tapered portion adapted to be moved inwardly on the spindle to clamp, center, and rigidly hold the roll thereon. A plurality of anti-friction idler rollers 23—23 journaled in the frame 11 are provided at points for supporting and guiding the paper and foil to a winding arbor 24 rotatably mounted in a housing 25 secured to the bed plate 12 at the front of the machine.

In order to maintain a proper tension on the tin foil as it is wound on the arbor 24, a cork friction roller 30 rotatably mounted on a lever 31 pivoted to the frame 11 is provided. The friction roller 30 is maintained in contact with the roll of tin foil 14 by a weight 32 suspended from the lever 31 by a coil spring 33. To properly tension the insulating paper 13 the upper and lower pairs of paper rolls on each side of the central frame 11 are each engaged on their lower peripheries by a strip 34 urged upwardly by a weight 35 connected thereto through a spring 37 and a cable 38 passing over a pulley 39 mounted on the frame. Engaging the weights 35—35 are vertical rods 40—40 secured to the frame for guiding the movement of the weights as the paper rolls decrease in diameter.

On the front end of the frame are mounted stationary platens or tables 44 and 45; the upper platen 44 having operatively associated therewith on the left hand side of the central frame 11 a knife 46 having a serrated cutting edge 47 for expediting the severing of the paper and foil while in motion. The knife 46 is carried by a bell crank 48 pivoted at 49 and the short arm 50 thereof is connected to one end of a tension spring 51 which has its other end fastened to the frame. Normally, the knife 46 is held in a raised position against the energy stored in the spring 51 by a latch 52 engaging a catch 54 integral with the bell crank 48. A portion of the latch 52 serves as an armature for an electromagnet 55 upon which the latch is pivoted so that when the electromagnet is energized the latch is rocked on its pivot to release it from engagement with the catch and thus permit the energy stored in the spring to force the knife into contact with the upper platen 44 to sever the sheets of foil and paper as they travel thereover on their way to the winding arbor 24. The lower platen 45 is provided on the left hand side of the frame with two individually controlled knives 60—61, since it is necessary that the upper knife 60 for severing the tin foil be operated prior to the operation of the lower knife 61 which severs the paper so that a number of turns of the insulating paper can be wound around the condenser after severing the foil to insure the proper insulation thereon. These knives are mounted and controlled by electromagnets 62—63 in the same manner as described for the knife 46.

To return the knives to their inoperative position against the tension of their individual springs, the forward end of a manually operated lever 65 pivoted in the housing 25 is depressed to raise a vertical rod 66 slidably mounted in brackets 67—67 secured to the frame 11, whereby horizontally extending arms 68—68 and 69 of the rod 66 engage and move the bell-cranks supporting the knives into locking engagement with the latches 52—52 as illustrated in Fig. 1. As shown in Fig. 8 the arm 69 extends laterally from the vertical rod 66 so that upon its elevation the arms 68—68 engage the bell-cranks supporting the knives 46 and 60 causing their restoration to normal, and the arm 69 engages pin 130 which is secured to extension arm 131 forming a part of the arm 129 of the bell-crank lever individual to knife 61. Consequently, when the rod 66 is elevated the knives 46 and 60 will be rotated in a counter-clockwise direction about its pivot. When the knives are rotated in the directions described, the bell-cranks will be latched by their associated latches and the knives will be held in their normal unactuated position until the associated electromagnets are again energized. Also pivotally mounted in the housing 25 is a bell-crank lever 70 having two longer arms thereof terminating in curved portions 71—71 adapted to be urged counter-clockwise by a spring 72 connected to the short arm of the bell-crank lever to engage and hold in place the paper and foil on the winding arbor after they have been severed from the supply rolls. This lever 70 is controlled by a latch 73 operatively associated with an electromagnet 74 in a manner similar to that previously described for the knives and is returned to its inoperative position by a U-shaped member 75 (Fig. 1) secured thereto and engaging the under side of the manually operated lever 65.

Figure 2:
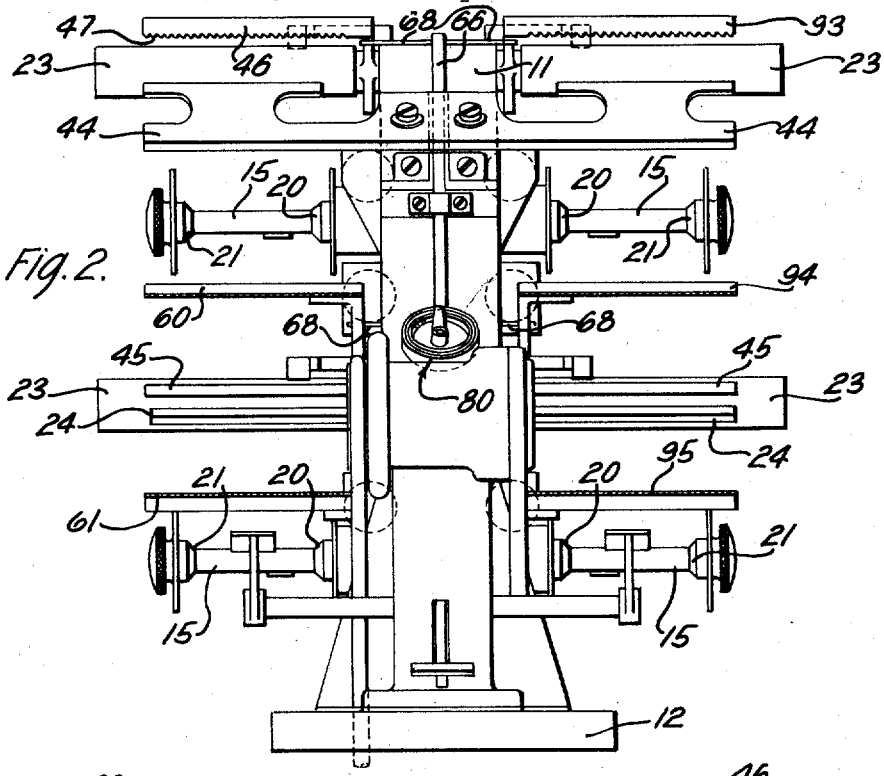
Fig. 2 is a front elevational view thereof shown with the spools of paper and metal foil removed.
Figure 3:
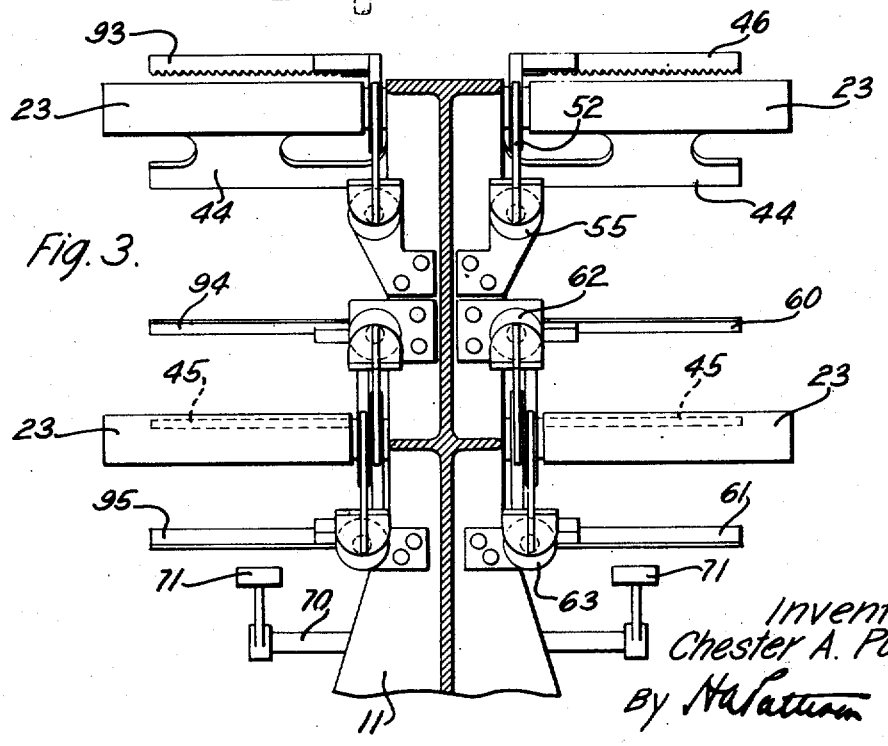
Fig. 3 is a transverse sectional view taken on the line 3—3 of Fig. 1.

Each of the electromagnets hereinbefore referred to is individually controlled by a counting mechanism 80 which is mounted in the top of the housing 25 and has a rotatable shaft 81 connected through contacting friction disks 78—79 (Fig. 1) and gearing (not shown) to the winding arbor 24. The counting mechanism also includes contacting arms 82—83 (Figs. 6 and 7) secured to the top of the shaft 81; the contacting arm 82 when rotating engages at predetermined intervals contacts 84 to 86, inclusive, insulatively mounted in a stationary sleeve 87 which can be adjustably positioned or oriented about the shaft 81, and the other contacting arm 83 is adapted to engage at predetermined intervals contacts 88 to 91, inclusive, insulatively mounted in a stationary sleeve 92 which may also be adjustably positioned or oriented with respect to the shaft 81 and the sleeve 87. The contacts 84 to 86, inclusive, when engaging the clockwise rotating contacting arm 82 complete energizing circuits to operate, in the order named, electromagnets and associated knives 93, 94 and 95 (Figs. 2, 3 and 6) which are positioned on the right hand side of the central frame 11 and are duplicates in construction to the knives on the left hand side of the frame hereinbefore described.

In like manner, the contacts 89 to 91 when engaged by the contacting arm 83 establish energizing circuits to operate the electromagnets and knives 46, 60 and 61 on the left hand side of the frame 11 in the order named, respectively. Contact 88 when in engagement with contacting arm 83 establishes an energizing circuit to operate the electromagnet 72 and thus effect the resilient engagement of the curved portion 71 with the paper and foil wound on the arbor 24. As illustrated in Fig. 6 the group of conductors 132 which are connected to contacts 88 to 91, inclusive, extend to electromagnets 72, 55, 63 and 62, respectively, but for the sake of simplifying the drawings the outline of these electromagnets has not been shown in this figure. From the foregoing it will be readily understood that by rotatably adjusting the sleeves 87 and 92 with respect to each other the knives on each side of the frame can be individually controlled to operate in a set sequence upon the completion of a predetermined number of revolutions of the winding arbor 24.

The arbor 24 is driven by a belt 100 (Fig. 4) engaging a pulley 101 keyed to the arbor, which belt is actuated by a driven pulley 102 (Fig. 5) of a clutch 103 from a motor 104 mounted under a bench 105 upon which the bed plate 12 is supported at the desired height. A pulley 106 keyed to a shaft 107 journaled in a bracket 108 fastened to the under side of the bench 105 is rotated by a belt 109 driven by another pulley 110 keyed to the shaft of the motor 104. As shown in Fig. 5, the driven pulley 102 of the clutch 103 is rotatably mounted on the shaft 107 and carries a friction ring 111 adapted to be engaged by a friction disk 112 slidably keyed to the shaft 107. The clutch 103 is operated to cause actuation of the arbor 24 by depressing a foot pedal 115 pivoted in a bracket 116 secured to the bench support 117 to move downwardly a rod 118 connected to a lever 119 which is pivoted at 120 to the bracket 108 and carries at its upper end an adjustable pin 121 for engaging and forcing the friction disk into engagement with the friction ring of the pulley 102. When pressure is removed from the foot pedal 115 a spring 122 pulls the lever upwardly to release the friction disk and bring a brake 123 into contact with the periphery of the pulley 102, thus to stop quickly rotation of the winding arbor 24.

In operating the winding machine to form electrical condensers, the tin foil 14 on the lower left hand side of the frame 11 is brought out over the idler rollers 23—23 and over the lower platen 45 to the left hand portion of the arbor 24, while the sheets of paper 13 from the two lower rolls on the left hand side of the frame are brought over the forward idler roller 23 and under the platen 45 to the arbor. The tin foil and two sheets of paper from the upper rolls on the left hand side of the frame are brought over the upper idler roller 23, and then over the upper platen 44 to the arbor 24 where the composite article of alternate layers of paper and foil is wound into a coil or roll to form a condenser. The sleeve 92 of the counting mechanism 80 is then adjustably rotated with respect to the sleeve 87 to allow for the number of revolutions of the arbor required to start the composite article of paper and foil onto the arbor on the right hand side of the frame so that the knives will be individually operated at the proper time to sever the foil and paper when the proper number of turns have been wound successively on the left and right hand sides of the arbor 24.

When the paper and foil have been started on the right hand portion of the arbor in a manner similar to that described for the left hand side, the operator depresses the foot pedal 115 (Fig. 4) to operate the clutch and effect rotation of the arbor as previously described. Since the shaft 81 of the counting mechanism 80 is connected through the friction disks 78—79 and suitable gearing to the arbor, the contacting arms 82—83 are also rotated whereby they engage contacts 84 to 86, inclusive, and 88 to 91, inclusive, respectively, when the desired number of turns have been wound on each condenser being formed as determined by the setting of the counting mechanism. With the counting mechanism adjusted as disclosed in Fig. 6, the contacting arm 83 rotating in a clockwise direction first engages the contact 88 to connect the electromagnet 74 to a source of electrical energy (not shown). The energization of this electromagnet attracts the latch 73 to release the bell-crank 70 whereby the energy stored in the spring 72 moves the curved portion 71—71 thereof into resilient engagement with the coils of paper and foil wound on the left and right hand portions of the arbor 74 to retain the paper and foil in place after the severance thereof from their supply rolls. Subsequently, the contacting arm 83 engages contact 89 to establish an energizing circuit for the electromagnet 55 to effect the actuation of the upper left hand knife 46 to sever the upper foil and two sheets of paper. Contacting arm 83 next makes engagement with contact 90 to complete the energizing circuit for the electromagnet 63 to effect the actuation of the knife 60 to sever the lower sheet of foil positioned on the left hand side of the frame.

The sheets of paper from the lower two rolls are now being wound around the alternate layers of foil and paper on the left hand portion of the arbor, and after a predetermined number of turns of the arbor contacting arm 83 engages contact 91 to establish an energizing circuit for the electromagnet 62 thus to cause the actuation of knife 61 to sever the two lower sheets of paper to thereby complete the winding of that particular condenser. Almost simultaneously with the operation of the knife 60, contacting arm 82, in accordance with the showing of Fig. 6, engages contact 84 to energize an electromagnet to operate upper knife 93 on the right hand side of the frame to sever the upper layers of paper and foil being wound onto the right hand portion of the arbor 24. Subsequently, in succession the contacting arm 82 engages contacts 85 and 86 to effect the operation of knives 94 and 95, respectively, whereby the winding of another condenser is completed on the right hand portion of the arbor a short interval of time after completion of the first condenser on the left hand side. Thereafter, the operator removes pressure from the foot pedal 115 to stop the rotation of the arbor, depresses the lever 65 to move the knives and curved portions 71—71 of the bell crank lever 70 to their inoperative positions, and then manually slides the formed condensers off the arbor.

In the winding of additional condensers, where the particular type of condenser comprises a smaller number of turns of paper and foil than the counting mechanism indicates in one revolution of its contacting arms 82—83, the friction disks 78—79 permit the operator to rotate manually the contacting arms around to the zero or starting point on the counting mechanism to thereby save the time that would otherwise be required to operate idly the machine until the counting mechanism registers zero. Thus, the machine is rapidly conditioned for the winding of additional condensers and the foregoing cycle of operations is repeated until the desired number of condensers are formed.

Although the invention herein described and illustrated is particularly well adapted for winding condensers, it will be understood that the invention is capable of many other modifications and applications and is to be limited only by the scope of the appended claims.

What is claimed is:

1. In a material winding machine, means for winding materials upon a mandrel, spring actuated severing members mounted for movement in opposite directions for severing separate portions of the material, latches for holding the severing members in inoperative positions, means for moving the severing members into effective engagement with the latches, and electromagnetic means for releasing the latches to effect the operation of the severing members to sever the materials at a predetermined time.

2. In a material winding machine, means for winding materials upon a mandrel, spring actuated severing members mounted for movement in opposite directions, latches for holding the severing members in inoperative positions, a reciprocating member, and means for moving said reciprocating member in one direction for moving said severing members in opposite directions to move them into effective engagement with the latches.

3. In a material winding machine, means for winding materials upon a mandrel, spring actuated severing members mounted for movement in opposite directions, latches for holding the severing members in inoperative positions, a reciprocating member, means for moving said reciprocating member in one direction for moving said severing members in opposite directions to move them into effective engagement with the latches, and electromagnetic means for releasing the latches to effect the operation of the severing members to sever the materials.

4. In a material winding machine, means for winding a material upon a mandrel, a spring actuated severing member, a latch for holding the severing member in an inoperative position, means for moving the severing member into effective engagement with the latch, electromagnetic means for releasing the latch to effect the operation of the severing member including a contacting member operatively associated with the winding means, and adjustable contacts for engaging the contacting member to effect the operation of the electromagnetic means to actuate the severing means upon the completion of a predetermined number of convolutions of the winding means.

5. A condenser winding machine, comprising a rotatable arbor, means for supplying strips of paper and foil to said arbor, a plurality of movable cutting means associated with the strips, electromagnetic means for controlling said cutting means, circuits including contacts for controlling said electromagnetic means, and a contact arm engaging said contacts in predetermined sequence, said contacts and said contact arm being mounted for relative movement between the former and the latter.

6. A condenser winding machine, comprising a rotatable arbor, means for supplying strips of paper and foil to said arbor, a plurality of movable cutting means associated with the strips, electromagnetic means for controlling said cutting means, circuits including contacts for controlling said electromagnetic means, and a movable contact arm engaging said contacts in predetermined sequence, said contact arm being rotated in timed relation with said arbor.

7. A condenser winding machine, comprising a rotatable arbor, means for supplying strips of paper and foil to said arbor, a plurality of movable cutting means associated with the strips, electromagnetic means for controlling said cutting means, circuits including contacts for controlling said electromagnetic means, a movable contact arm engaging said contacts in predetermined sequence, and means for adjusting the position of said contacts for varying the amount of said strip material wound on said arbor.

8. A condenser winding machine, comprising a rotatable arbor, means for supplying strips of material and foil to said arbor, movable cutting means associated with said strips, a holding element positioned to be moved into engagement with the wound material upon said arbor for assuring the winding of the material upon the arbor after the strips of paper and foil have been severed by said cutting means, and means for actuating said holding element and said cutting means in predetermined sequence.

9. In a condenser winding machine, a rotatable winding arbor, means for supplying strips of material to said arbor, means for severing said strips, a holding element positioned to be moved into engagement with the wound material on said arbor for preventing the unwinding thereof after the strips have been severed by said severing means, means for actuating said severing means, and means operated in predetermined timed relation with the last mentioned means for actuating said holding element.

10. In apparatus of the character described, the combination of a winding arbor, driving means for rotating said arbor to wind material thereon, holding means mounted for movement relative to said arbor, and means under the control of the winding means for pressing said holding means against the material wound on said arbor when a predetermined amount of material has been wound thereon.

11. In apparatus of the character described, the combination of a winding arbor, driving means for rotating said arbor to wind material thereon, holding means mounted for movement relative to said arbor, and means actuated in timed relation with the winding operation for pressing said holding means against the material wound on said arbor when a predetermined amount of material has been wound thereon.

12. In apparatus of the character described, the combination of a winding arbor, means for rotating said arbor to wind material thereon, a support movable toward and away from said arbor, holding means carried by said support, means including electromagnetic means operably connected with said support and adapted when energized to cause movement of said support toward said arbor for pressing said holding means against the wound material, and means normally holding said support away from said arbor.

13. In apparatus of the character described, the combination of a winding arbor, means for rotating said arbor to wind material thereon, holding means mounted for movement relative to said arbor, means for pressing said holding means against the material wound on said arbor, and electromagnetic means adapted to be energized in timed relation with the cessation of the winding operation to release said holding means.

14. In apparatus of the character described, the combination of a winding arbor, means for rotating said arbor to wind material thereon, holding means mounted for movement relative to said arbor, means for pressing said holding means against the material wound on said arbor, and electromagnetic means adapted to be energized upon the occurrence of a predetermined condition during the winding operation to release said holding means.

15. In apparatus of the character described, the combination of a winding arbor, means for rotating said arbor to wind material thereon, holding means mounted for movement relative to said arbor, means for pressing said holding means against the material wound on said arbor, and electromagnetic means adapted to be energized in timed relation with the winding operation to release said holding means.

16. In apparatus of the character described, the combination of a winding arbor, means for rotating said arbor to wind material thereon, holding means mounted for movement relative to said arbor, means for pressing said holding means against the material wound on said arbor, and electromagnetic means under the control of the winding means to release said holding means.

17. In a material winding apparatus, the combination of a winding arbor, driving means for rotating said arbor to wind material thereon, a holding element mounted for movement relative to said arbor, means normally holding said element away from said arbor, and means rendered effective upon the occurrence of a predetermined condition during the winding operation for pressing said holding element upon the material wound on said arbor.

18. In a material winding apparatus, the combination of a winding arbor, driving means for rotating said arbor to wind material thereon, a holding element mounted for movement relative to said arbor, means normally holding said element away from said arbor, and means rendered effective in timed relation with the winding operation for pressing said holding element upon the material wound on said arbor.

19. In a material winding apparatus, the combination of a winding arbor, driving means for rotating said arbor to wind material thereon, a holding element mounted for movement relative to said arbor, retaining means normally holding said element away from said arbor, means adapted to be actuated upon the occurrence of a predetermined condition during the winding operation to release said retaining means, and means rendered effective upon the release of said retaining means for pressing said holding element upon the material wound on said arbor.

20. In a material winding apparatus, the combination of a winding arbor, driving means for rotating said arbor to wind material thereon, a holding element mounted for movement relative to said arbor, retaining means normally holding said element away from said arbor, means adapted to be actuated in timed relation with the winding operation to release said retaining means, and means rendered effective upon the release of said retaining means for pressing said holding element upon the material wound on said arbor.

CHESTER A. PURDY.